United States Patent Office 3,287,160
Patented Nov. 22, 1966

3,287,160
TETRAFUNCTIONAL SILYL - OXYMETHYLENE COMPOUNDS AS CURING AGENTS FOR EPOXY RESINS
Hans H. Ender, Buffalo, N.Y., assignor to Union Carbide Corporation, a corporation of New York
No Drawing. Filed July 12, 1962, Ser. No. 209,282
11 Claims. (Cl. 117—132)

This invention relates to a class of novel organo-silicon compounds, to a process for producing these compounds, and to the use of these compounds in curing epoxy resins.

The compounds of this invention are represented by the formula:

(A) $\quad Si[(OCH_2)_nOR]_4$ wherein each $n$ is an integer having a value from one to about five or greater and each R is an alkyl group containing from one to about four carbon atoms. The value of $n$ and the number of carbon atoms in the R group can be the same or different in each of the four oxy-methylene chains attached to the silicon atom. R can be, for example methyl, ethyl, isopropyl, n-butyl or t-butyl.

A preferred class of compounds of this invention are those represented by the formula:

(B) $\quad Si[(OCH_2)_nOCH_3]_4$ wherein each $n$ is an integer having a value from one to two, inclusive.

Illustrative examples of the compounds represented by Formula A are:

(a) $\quad Si(OCH_2OCH_3)_4$
(b) $\quad Si[(OCH_2)_5OC_4H_9]_4$ (c) 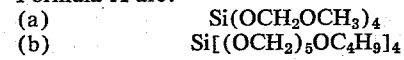

(d) 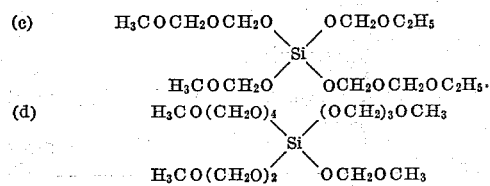

and the like.

The compounds of Formula A can be prepared by a process which comprises effecting reaction between a silicon tetrahalide represented by the formula $SiX_4$, wherein X is chlorine or bromine, and formaldehyde by adding a solution of $SiX_4$ in an inert liquid organic solvent to a mixture of a basic hydrogen halide acceptor and formaldehyde dissolved in an alcohol represented by the formula ROH, wherein R has the meaning defined hereinabove with reference to Formula A, while maintaining the combined reaction mixture at a temperature between about −20° C. and about 30° C., preferably between about 0° C. and about 20° C. The best yields of the compounds of Formula A are obtained when the reaction is carried out under anhydrous conditions, although satisfactory yields can be obtained in the presence of limited amounts of water. It is also preferred to maintain the pH of the combined reaction mixture in the range from about 7 to about 9. This can be conveniently done by choosing a hydrogen halide acceptor of the proper basicity and by adjusting the concentration of the hydrogen halide acceptor.

The formaldehyde dissolved in alcohol can be prepared in situ by bubbling $CH_2O$ gas into a mixture of hydrogen halide acceptor and alcohol, or a previously prepared solution of $CH_2O$ in alcohol can be employed. A convenient commercial source of formaldehyde dissolved in alcohols are the "Formcels." The compositions of typical Formcels are as follows.

| Formaldehyde Source | Alcohol (ROH) | Percent by Weight | | |
|---|---|---|---|---|
| | | Formaldehyde | Alcohol | Water |
| Methyl Formcel | Methanol | 55 | 33 | 12 |
| N-Propyl Formcel | N-Propanol | 40 | 51.5 | 8.5 |
| Iso-Butyl Formcel | Iso-butanol | 40 | 51.5 | 8.5 |
| N-Butyl Formcel | N-butanol | 40 | 51.5 | 8.5 |

The amounts of water present in Formcels tend to reduce the yield of compounds of Formula A by only a small amount over yields obtained under anhydrous conditions.

Hydrogen halide acceptors provide a convenient means for removing hydrogen halide from the reaction immediately after it is formed. Examples of hydrogen halide acceptors are basic nitrogen-containing organic compounds, for example, pyridine, quinoline, alkyl-substituted pyridines, such as 2-methyl pyridine and 2-methyl-4-propyl pyridine, trialkyl amines, such as trimethyl amine, triethyl amine, dimethylisopropyl amine and tributyl amine, and other compounds capable of readily combining with hydrogen halides. Pyridine is a preferred hydrogen halide acceptor. Hydrogen halide acceptors which are least desirable are primary and secondary amines which can undergo a side reaction with the silicon tetrahalide to form silyl amines.

The silicon tetrahalide can be dissolved in any organic solvent which is inert with respect to the reactants, products and hydrogen halide acceptor and which is liquid at the reaction temperature. The ether solvents have been found to give the best results. Aromatic hydrocarbon and chlorinated hydrocarbon solvents, such as carbon tetrachloride, trichloroethylene, benzene, toluene, chlorobenzene and the like, have also proven to be useful but in some instances provide difficulties in handling reaction mixtures in which they are employed. For example, benzene freezes at about 5° C. and toluene tends to form emulsion. The solvents most preferred are water-immiscible ether solvents such as diethyl ether, diisopropyl ether, and methyl butyl ether.

The above described inert organic solvents can also, if desired, be added to the mixture of formaldehyde, alcohol and hydrogen halide acceptor before addition of the $SiX_4$ solution. This is particularly desirable where the formaldehyde solution and hydrogen halide acceptor are not mutually soluble, but where both dissolve in the added solvent to give a homogeneous solution.

The process of this invention can be conveniently carried out by forming the mixture of hydrogen halide acceptor and formaldehyde in alcohol in a conventional reaction vessel, cooling this mixture to the desired reaction temperature and then adding the solution of $SiX_4$ to the hydrogen halide acceptor-formaldehyde mixture while maintaining the contents of the reaction vessel at a temperature between about −20° C. and about 30° C.

It is preferred to add the $SiX_4$ solution slowly to the hydrogen halide acceptor-formaldehyde mixture, for example, by the use of a dropping funnel.

It is preferable to stir the reaction mixture during the addition of the $SiX_4$ solution and for a short time after the addition is complete in order to insure complete reaction. Stirring also helps to prevent caking of any solid product formed by the side reaction of the hydrogen halide acceptor with HX, for example an insoluble solid compound such as pyridine hydrochloride or triethyl amine hydrochloride.

The time required to complete the reaction can vary over wide limits. It has been found convenient to add the SiX$_4$ solution at a rate that permits the reaction mixture to be maintained at a temperature below 20° C. and then to stir the reaction mixture for about 30 to 60 minutes after addition of the SiX$_4$ solution is completed.

The reaction is conveniently carried out at atmospheric pressure, no advantage being obtained from the use of reduced or superatmospheric pressures.

The product of Formula A can be recovered from the final reaction mixture by conventional procedures, for example by removing solid material (such as pyridine hydrochloride) by filtration and separating the compound of Formula A from the filtrate by fractional distillation.

The nature of the R groups in the compounds of Formula A depends on the particular alcohol ROH employed in the process of this invention. When the alcohol is methanol, the R groups are methyl groups (and Formula A becomes $Si[(OCH_2)_nOCH_3]_4$, where each $n$ is an integer from 1 to about 5 or greater), while the use of butanol introduces butyl groups into the compounds of Formula A. When a mixture of alcohols ROH is used, different R groups can be introduced into the same molecule of a compound of Formula A.

The value of $n$ in the compounds of Formula A depends upon the conditions employed in the process of this invention. Small values of $n$, on the order of 1 and 2, are favored by a low mole ratio of formaldehyde to SiX$_4$ in the reaction mixture, by fractional distillation temperatures above about 50° C. and by the presence of small amounts of water in the reaction mixture. Larger values of $n$, up to 5 or greater, are favored by a high mole ratio of formaldehyde to SiX$_4$ in the reaction mixture, by fractional distillation temperatures below about 50° C. and by anhydrous conditions. Thus the compounds of Formula B are best prepared using formaldehyde dissolved in methanol and a small amount of water, a relatively low ratio of CH$_2$O to SiX$_4$ (on the order of 6 to 1 or less), and a fractional distillation temperature above about 50° C.

The compounds of Formula A are colorless liquids at room temperature and are soluble in water and common organic solvents except aliphatic hydrocarbon solvents.

The compounds of Formula A are useful, in conjunction with metal salts of carboxylic acids, in promoting the cure of epxopy resins.

The epoxy resin is cured by mixing with the resin from about 5 to about 30 weight percent (based on the weight of resin) of a compound of Formula A and from about 0.05 to about 1.0 weight percent (based on the weight of resin) of a metal salt of a carboxylic acid and heating the mixture by conventional methods at a temperature between about 50° C. and about 250° C. (preferably at about 100° C.) until the mixture cures to a solid resinous material.

The epoxy resins which can be cured using the compounds of Formula A include, for example, resins derived from the diglycidyl ethers of polyhydric phenols as well as blends of such diglycidyl ethers of polyhydric phenols with such modifying ingredients as the polyphenol compounds. Such epoxides can be prepared by the reaction of epichlorohydrin with a polyhydric phenol in the presence of a base such as an alkali or alkaline earth metal hydroxide. In the preparation of such epoxy resins various dihydric phenols can be employed to react with epichlorohydrin and they include, 2,2-bis(4-hydroxyphenyl) propane, bis(4-hydroxyphenyl)methane, 1,7-bis(4-hydroxyphenyl)ethane, 1,1-bis(4-hydroxyphenyl)isobutane, 2,2-bis(4-hydroxyphenyl)butane, 2,2-bis(4-hydroxy-2-methylphenyl)propane, 2,2-bis(4-hydroxy-2-tertiarybutylphenyl)propane, 2,2-bis(4-hydroxy-2-tertiarybutylphenyl)propane, 2,2-bis(2-hydroxynaphthyl)pentane, and the like.

The epoxy resins which can be cured by means of the compounds of this invention also include the acid or anhydride curable resins which are derivatives of cyclohexene epoxide, for example, 3,4-epoxy-6-methylcyclohexylmethyl-3,4-epoxy-6-methylcyclohexanecarboxylate, 1-epoxyethyl-3,4-epoxycyclohexane, dicyclopentadiene dioxide, and the like.

The metal salts of carboxylic acids which can be employed in conjunction with the compounds of Formula A in curing epoxy resins according to the present invention include the carboxylic acid salts of lead, tin, zirconium, iron, cadmium, titanium, calcium, and manganese. It is preferred that the carboxylic acid salts of the above metals be characterized by the property that each carboxylic acid radical contains from 2 to about 14 carbon atoms. It is also preferred that the salt be soluble in the uncured epoxy resin although insoluble salts can be employed if they are properly dispersed in the system. Typical of the metal salts of carboxylic acids which are operative are the naphthenates, propionates, butyrates, hexoates, oleates, benzoates, laurates, linoleates, stearates and octoates of the above metals.

The epoxy resins cured as described above are particularly useful in providing adherent, corrosion resistant coatings for solid metal surfaces, for example, iron, steel, aluminum, copper and the like.

The compounds of this invention are also useful as tanning agents for leather. The leather is prepared for tanning by conventional procedures and the compound (or mixture of compounds) of Formula A is applied to the leather, preferably as a solution of the compound of Formula A in a volatile, polar, organic solvent such as ethers, alcohols or ketones. The concentration of this solution is not critical and can vary over wide limits. The tanning solution can be applied to the leather by painting, spraying and the like, or the leather can be immersed in the solution for a short time. The leather to which the tanning solution has been applied is then dried by conventional methods to yield a uniformly tanned leather.

The following examples are presented.

Example 1

A Pyrex flask fitted with a stirrer and dropping funnel was charged with

| | Grams |
|---|---|
| Methyl Formcel | 66 |
| Pyridine | 70 |
| Diisopropyl ether | 136 | and the flask was cooled to —10° C.

The dropping funnel contained

| | Grams |
|---|---|
| SiCl$_4$ | 34 |
| in diisopropyl ether | 68 |

The mole ratio of formaldehyde to SiCl$_4$ was about 6 to 1. The SiCl$_4$ solution was added dropwise to the methyl Formcel-pyridine solution while maintaining the temperature at about 0° to 20° C.

A pasty precipitate of pyridine hydrochloride formed. The solution was then separated from the precipitate by filtration and the precipitate was washed repeatedly with diisopropyl ether. The ether solutions were combined, filtered and distilled, first at atmospheric pressure using an unpacked column until most of the ether is removed, then without a column in vacuo at temperatures up to 130° C. to remove the remaining ether, methanol, pyridine, and some formaldehyde. About 38 grams of colorless liquid remained in the distillation flask which was identified as a compound of this invention having the formula $Si(OCH_2OCH_3)_4$. The yield was 70 percent based on silicon tetrachloride.

Results of elemental analysis:

Calc. for $Si(OCH_2OCH_3)_4$: Si, 10.3%; $4x(CH_2O)$, 43.2%. Found: Si, 10.9%; $4x(CH_2O)$, 44%.

Example 2

The process of Example 1 was repeated except that the water concentration was doubled. The yield of $Si(OCH_2OCH_3)_4$ dropped from 70 percent (as in Example 1) to 55 percent, based on silicon tetrachloride.

Example 3

The compound $Si(OCH_2OC_4H_9)_4$ can be prepared in accordance with the method of Example 1 by adding a solution of $SiBr_4$ in dibutyl ether to a mixture of butyl Formcel, trimethylamine and dibutyl ether.

Example 4

A 3 necked, 2-liter Pyrex flask fitted with dropping funnel, stirrer and thermometer was charged with 327 grams (6 moles $CH_2O$) methyl Formcel, 350 grams (4 moles+10%) pyridine and 300 grams diisopropylether and the mixture was cooled to —20° C. The dropping funnel connected to the flask was charged with a mixture of 170 grams (1 mole) $SiCl_4$ dissolved in 300 grams dry diisopropylether. The $SiCl_4$ solution was added to the solution in the flask so slowly that the temperature in the flask never rose above 0° C. A voluminous precipitate of pyridinium hydrochloride formed. The excess pyridine produced a soft, pasty precipitate which separated easily from the diisopropylether solution. The precipitate was separated by decantation and washed repeatedly in the flask with 100 gram portions of dry diisopropylether until the ether did not extract any more oily substance.

The combined ether extracts were shaken with calcium chloride in order to eliminate excess pyridine and methanol, and were then filtered through a dry filter in a dry box. The clear solution was then distilled in vacuo at about 30° and finally at 60° C. and 2 mm. Hg pressure. About 171 grams of colorless oil remained in the distillation flask which was identified as a compound of this invention having the formula:

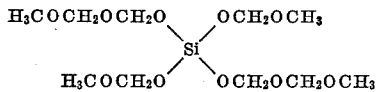

The yield was about 63 percent based on silicon tetrachloride.

The product had the following properties:

Viscosity at 25° C. _____cps__ 5
Specific gravity at 25° C. _____ 1.178
Refractive index 25° C. _____ 1.4148

Results of elemental analysis and molecular weight determination:

Calculated for $C_{10}H_{24}O_{10}Si$: C=36.1%, H=7.2%, Si=8.5%, $6x(H_2CO)$=54%, mol. wt.=332. Found: C=36.2%, H=7.4%, Si=8.6%, $6x(H_2CO)$=53%, mol. wt.=347.

Example 5

A resin mixture was prepared which contained 9 grams of 3,4 - epoxy - 6 - methylcyclohexylmethyl - 3,4 - epoxy-6-methylcyclohexanecarboxylate, 1 gram of

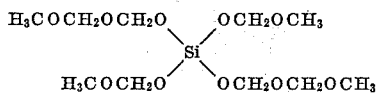

(about 11 weight percent based on the epoxide) and 0.1 gram of stannous octoate (about 1 weight percent based on the epoxide). The mixture was brushed on to a mild steel panel and the coated panel was heated in an oven at 100° C. for one hour. The epoxide composition had cured to a hard, elastic resinous coating which adhered strongly to the steel surface. The coating protected the steel surface from the corrosive effects of an aerated sodium chloride-calcium chloride brine for more than one month.

What is claimed is:

1. Organosilicon compounds represented by the formula:

wherein each $n$ is integer having a value from one to about five, and each R is an alkyl group containing from one to about four carbon atoms.

2. Organosilicon compounds represented by the formula:

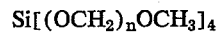

wherein each $n$ is an integer having a value from one to two, inclusive.

3. The compound having the formula $Si(OCH_2OCH_3)_4$.

4. The compound having the formula

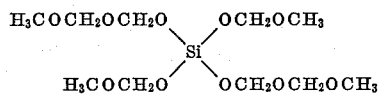

5. A process for producing organosilicon compounds represented by the formula

wherein each $n$ is integer having a value from one to about five, and each R is an alkyl group containing from one to about four carbon atoms, which process comprises effecting reaction between (1) a silicon tetrahalide represented by the formula $SiX_4$, wherein X is selected from the class consisting of chlorine and bromine, and (2) formaldehyde, by adding a solution of said silicon tetrahalide in an inert liquid organic solvent to a mixture of formaldehyde dissolved in an alcohol represented by the formula ROH, wherein R has the meaning defined hereinabove, and a basic hydrogen halide acceptor while maintaining the combined reaction mixture at a temperature between about —20° C. and about 30° C.

6. A process for producing organosilicon compounds represented by the formula

wherein each $n$ is integer having a value from one to about five, and each R is an alkyl group containing from one to about four carbon atoms, which process comprises effecting reaction between (1) a silicon tetrahalide represented by the formula $SiX_4$, wherein X is selected from the class consisting of chlorine and bromine, and (2) formaldehyde, by adding a solution of said silicon tetrahalide in a water-immiscible ether solvent to a mixture of formaldehyde dissolved in an alcohol represented by the formula ROH, wherein R has the meaning defined hereinabove, and a hydrogen halide acceptor selected from the class consisting of pyridine, quinoline, alkyl-substituted pyridines and trialkylamines while maintaining the combined reaction mixture at a temperature between about —20° C. and about 30° C.

7. A process for producing organosilicon compounds represented by the formula

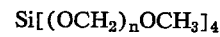

wherein $n$ is an integer having a value from one to about five, which process comprises effecting reaction between silicon tetrachloride and formaldehyde by adding a solution of silicon tetrachloride in an inert liquid organic solvent to a mixture of formaldehyde dissolved in methanol and a basic hydrogen chloride acceptor while maintaining the combined reaction mixture at a temperature between about —20° C. and about 30° C.

8. A process for producing organosilicon compounds represented by the formula

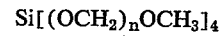

wherein $n$ is an integer having a value from one to about five, which process comprises effecting reaction between silicon tetrachloride and formaldehyde by adding a solution of silicon tetrachloride in diisopropyl ether to a mixture of formaldehyde dissolved in methanol and pyridine while maintaining the combined reaction mixture at a temperature between about −20° C. and about 30° C.

9. A process for curing epoxy resins which comprises forming a mixture of an epoxy resin selected from the class consisting of epoxy resin derivatives of diglycidyl ethers of polyhydric phenols, blends of epoxy resin derivatives of diglycidyl ethers of polyhydric phenols with polyphenol compounds, and epoxy resin derivatives of cyclohexene epoxide, from about 5 to about 30 weight percent (based on the weight of said resin) of an organosilicon compound represented by the formula $$Si[(OCH_2)_nOR]_4$$

wherein $n$ is an integer having a value from one to about five and each R is an alkyl group containing from one to about four carbon atoms, and from about 0.05 to about 1.0 weight percent (based on the weight of said resin) of a carboxylic acid salt of a metal selected from the class consisting of lead, tin, zirconium, iron, cadmium, titanium, calcium and manganese, the carboxylic acid radicals in said salts each containing from 2 to about 14 carbon atoms, and heating said mixture at a temperature between about 50° C. and about 250° C.

10. A solid metal having as a coating on a surface thereof a heat cured composition comprising a thermosetting epoxy resin selected from the class consisting of epoxy resin derivatives of diglycidyl ethers of polyhydric phenols, blends of epoxy resin derivatives of diglycidyl ethers of polyhydric phenols with polyphenol compounds, and epoxy resin derivatives of cyclohexene epoxide, from about 5 to about 30 weight percent (based on the weight of said resin) of an organosilicon compound represented by the formula $$Si[(OCH_2)_nOR]_4$$

wherein $n$ is an integer having a value from one to about five and each R is an alkyl group containing from one to about four carbon atoms, and from about 0.05 to about 1.0 weight percent (based on the weight of said resin) of a carboxylic acid salt of a metal selected from the class consisting of lead, tin, zirconium, iron, cadmium, titanium, calcium and manganese, the carboxylic acid radicals in said salts each containing from 2 to about 14 carbon atoms.

11. Steel coated with the heat cured composition comprising 3,4-epoxy-6-methylcyclohexylmethyl-3,4-epoxy-6-methylcyclohexanecarboxylate, about 11 weight percent (based on said epoxide) of an organosilicon compound having the formula

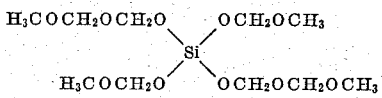

and about 1 weight percent (based on said epoxide) of stannous octoate.

References Cited by the Examiner
UNITED STATES PATENTS

| | | | |
|---|---|---|---|
| 2,902,467 | 9/1959 | Chipman | 260—18 |
| 2,965,515 | 12/1960 | Jellinek | 260—448.8 |
| 2,999,827 | 9/1961 | McGary et al. | 260—18 |
| 3,055,858 | 9/1962 | Frye et al. | 260—18 |

OTHER REFERENCES

Abbott et al.: J. Chem. Eng. Data 6, 437–42 (1961).

LEON J. BERCOVITZ, *Primary Examiner.*

WILLIAM H. SHORT, *Examiner.*

R. W. GRIFFIN, C. W. IVY, *Assistant Examiners.*